US012352914B2

(12) United States Patent
Li et al.

(10) Patent No.: US 12,352,914 B2
(45) Date of Patent: Jul. 8, 2025

(54) STEREOSCOPIC IDENTIFICATION METHOD AND APPARATUS FOR DISTURBANCE STRESS EVOLUTION PROCESS OF UNDERGROUND CAVE SURROUNDING ROCK (71) Applicant: INSTITUTE OF ROCK AND SOIL MECHANICS, CHINESE ACADEMY OF SCIENCES, Wuhan (CN)

(72) Inventors: Shaojun Li, Wuhan (CN); Guangliang Feng, Wuhan (CN); Minzong Zheng, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 298 days.

(21) Appl. No.: 18/051,503

(22) Filed: Oct. 31, 2022

(65) Prior Publication Data
US 2023/0324574 A1 Oct. 12, 2023

(30) Foreign Application Priority Data
Apr. 12, 2022 (CN) .......................... 202210376484.4

(51) Int. Cl.
G01V 1/28 (2006.01)
G01V 1/30 (2006.01)
(52) U.S. Cl.
CPC ................ G01V 1/288 (2013.01); G01V 1/30 (2013.01)

(58) Field of Classification Search
CPC .. G01V 1/288; G01V 1/30; G01L 5/00; G06F 30/20; G06F 16/215; G06F 2119/14; G16C 10/00; G16C 60/00
See application file for complete search history.

(56) References Cited

U.S. PATENT DOCUMENTS

2021/0140313 A1* 5/2021 Busetti .................... G06F 30/23

FOREIGN PATENT DOCUMENTS

CN 110244354 A * 9/2019 ............. G01V 1/288

OTHER PUBLICATIONS

English machine translation of CN-110244354-A (Year: 2019).*

* cited by examiner

Primary Examiner — Walter L Lindsay, Jr.
Assistant Examiner — Geoffrey T Evans
(74) Attorney, Agent, or Firm — Syncoda LLC; Feng Ma (57) ABSTRACT A stereoscopic identification method and apparatus for disturbance stress evolution process of underground cave surrounding rock perform a numerical inverse analysis of three-dimensional stereoscopic disturbance stress of a surrounding rock of the target underground cave on the basis of measurement values of three-component microseismometers and disturbance stress gauges. During the analysis, the overall prediction values are corrected from point to volume based on the measurement values to achieve a high-precision identification effect of the evolution process of the stereoscopic disturbance stress of the surrounding rock.

9 Claims, 5 Drawing Sheets

STEREOSCOPIC IDENTIFICATION METHOD AND APPARATUS FOR DISTURBANCE STRESS EVOLUTION PROCESS OF UNDERGROUND CAVE SURROUNDING ROCK

CROSS-REFERENCE TO RELATED APPLICATIONS

The present application claims priority to Chinese Patent Application No. 202210376484.4 filed on Apr. 12, 2022, the disclosure of which is hereby incorporated by reference in its entirety.

BACKGROUND

The process of surrounding rock damage and disaster caused by disturbances such as engineering excavation and blasting is reflected firstly in the stress changes. Testing and identifying disturbance stresses in a three-dimensional space is an important means to evaluate a short-term performance and a long-term performance of a rock mass structure.

Through the test and acquisition of the stress evolution information, the stability of the test area can be analyzed, and the rock burst, deep rock mass rupture and other engineering disasters can be predicted based on the evaluation index of the stress disturbance degree of the surrounding rock, so that the engineering disasters can be prevented in advance and the construction safety can be guaranteed.

At present, the conventional test and high precision identification of the disturbance stress are limited to a local single point of the rock mass; that is, the disturbance stress gauge is placed by drilling at the test point, the grout is injected to make the disturbance stress gauge couple with the rock mass on the wall of the borehole; and the disturbance stress of the test point is obtained accurately by the disturbance stress gauge, a collection system, and data interpretation technology.

However, in the research process of existing related technologies, the inventors found that although multiple disturbance stress gauges can be used to obtain disturbance stresses at multiple single-point positions, the degree and distribution of stress changes in the three-dimensional space of the underground cave rock caused by excavation are very complicated, and the disturbance stress test data at local multiple single-point positions are limited. It is difficult to accurately obtain the evolution process of the disturbance stress in the three-dimensional space of the underground cave rock mass based on these limited data, and thus the accurate evaluation and prediction of engineering phenomenon of three-dimensional instability of the underground cave rock are affected.

SUMMARY

The disclosure relates to the geological field, in particular to a stereoscopic identification method and apparatus for disturbance stress evolution process of underground cave surrounding rock.

This disclosure provides a stereoscopic identification method for disturbance stress evolution process of underground cave surrounding rock, for performing a numerical inverse analysis of three-dimensional stereoscopic disturbance stress of a surrounding rock of the target underground cave on the basis of measurement values of a three-component microseismometer and a disturbance stress gauge, and during the analysis, the overall prediction values are corrected from point to volume based on the measurement values to achieve a high-precision identification effect of the evolution process of the stereoscopic disturbance stress of the surrounding rock.

In a first aspect, the disclosure provides a stereoscopic identification method for disturbance stress evolution process of underground cave surrounding rock, comprising:

collecting rock structural characteristics of a borehole between a target underground cave of which the disturbance stress evolution process is to be measured and a nearby excavated cave through a borehole camera before the target underground cave is excavated;

collecting rock fracture vibration wave information on the periphery of the borehole through a three-component microseismometer placed in the borehole between the target underground cave and the nearby excavated cave during the process of excavating the target underground cave;

calculating microseismic apparent stress evolution information at each source location of rock fracture based on the rock fracture vibration wave information;

collecting disturbance stress evolution information at a position where the disturbance stress gauge is mounted through the disturbance stress gauge placed in the borehole during the process of excavating the target underground cave; and performing a numerical inverse analysis of three-dimensional stereoscopic disturbance stress of a surrounding rock of the target underground cave in combination with the rock structural characteristics of the borehole, the microseismic apparent stress evolution information at each source location of rock fracture, and the disturbance stress evolution information at a position where the disturbance stress gauge is mounted, the result of analysis being taken as a stereoscopic identification result of the disturbance stress evolution process of underground cave surrounding rock of the target underground cave.

In some embodiments, the three-component micro seismometer may include a first three-component microseismometer and a second three-component microseismometer; the disturbance stress gauge may include a first disturbance stress gauge, a second disturbance stress gauge and a third disturbance stress gauge; the first three-component microseismometer, the first disturbance stress gauge, the second disturbance stress gauge, the third disturbance stress gauge, and the second three-component microseismometer are placed in the borehole in order in a direction from the target underground cave to the nearby excavated cave;

during a placing process, the first three-component microseismometer, the first disturbance stress gauge, the second disturbance stress gauge, the third disturbance stress gauge, and the second three-component microseismometer are pushed into corresponding positions in order by a pusher and then the pusher is withdrawn.

In some embodiments, a process of positioning a source location of rock fracture may comprise:

measuring spatial coordinates of the first three-component microseismometer and the second three-component microseismometer, respectively;

obtaining vibration wave information collected by the first three-component microseismometer and the second three-component microseismometer; and determining the source location of rock fracture based on an overlapping position of the vibration wave information collected by the first three-component microseismometer and the second three-component microseismometer under a propagation positioning mechanism.

In some embodiments, distances from the first three-component microseismometer, the first disturbance stress gauge, the second disturbance stress gauge, the third disturbance stress gauge, and the second three-component microseismometer to a surface of a surrounding rock of the target underground cave are 0.5 m, 1 m, 3 m, 7 m, and 8 m, respectively.

In some embodiments, the method may further comprise: performing a full-hole grouting in the borehole to complete placement after the three-component microseismometers and the disturbance stress gauges are placed at corresponding positions in the borehole.

In some embodiments, during the numerical inverse analysis of three-dimensional stereoscopic disturbance stress of the surrounding rock of the target underground cave, performing the following analysis based on an established numerical computing grid for the underground cave, wherein the grid is refined at positions adjacent to a surface of underground cave surrounding rock and the borehole:

performing underground cave excavation simulation to calculate a preliminary simulation result of the disturbance stress evolution process during the process of excavating the target underground cave; and performing an inverse-analysis on values of ground stress and material parameters involved in the preliminary simulation result of the disturbance stress evolution process by taking the rock structural characteristics of the borehole, the microseismic apparent stress evolution information at each source location of rock fracture, and the disturbance stress evolution information at a position where the disturbance stress gauge is mounted as basic data, and outputting a target simulation result of the disturbance stress evolution process which conforms to the three of the rock structural characteristics of the borehole, the microseismic apparent stress evolution information at each source location of rock fracture, and the disturbance stress evolution information at a position where the disturbance stress gauge is mounted as a stereoscopic identification result of the disturbance stress evolution process of underground cave surrounding rock of the target underground cave.

In some embodiments, during the numerical inverse analysis of three-dimensional stereoscopic disturbance stress of the surrounding rock of the target underground cave, target functions are set with deviations between simulation values and the microseismic apparent stress evolution information at each source location of rock fracture and the disturbance stress evolution information at a position where the disturbance stress gauge is mounted, and then a relationship between parameters for inverse-analysis and the target functions is established with a mechanism of back-propagation neural networks, and optimization is performed with a gradient descent algorithm, and finally updated simulation values are caused to conform to the three of the rock structural characteristics of the borehole, the microseismic apparent stress evolution information at each source location of rock fracture, and the disturbance stress evolution information at a position where the disturbance stress gauge is mounted.

In a second aspect, the disclosure provides a stereoscopic identification device for disturbance stress evolution process of underground cave surrounding rock, comprising:

a first collection unit, configured for collecting rock structural characteristics of a borehole between a target underground cave of which the disturbance stress evolution process is to be measured and a nearby excavated cave through a borehole camera before the target underground cave is excavated;

a second collection unit, configured for collecting rock fracture vibration wave information on the periphery of the borehole through a three-component microseismometer placed in the borehole between the target underground cave and the nearby excavated cave during the process of excavating the target underground cave;

a calculation unit, configured for calculating microseismic apparent stress evolution information at each source location of rock fracture based on the rock fracture vibration wave information;

a third collection unit, configured for collecting disturbance stress evolution information at a position where a disturbance stress gauge placed in the borehole is mounted through the disturbance stress gauge during the process of excavating the target underground cave;

an inverse analysis unit, configured for performing a numerical inverse analysis of three-dimensional stereoscopic disturbance stress of the surrounding rock of the target underground cave in combination with the rock structural characteristics of the borehole, the microseismic apparent stress evolution information at each source location of rock fracture, and the disturbance stress evolution information at a position where the disturbance stress gauge is mounted, the result of analysis being taken as a stereoscopic identification result of the disturbance stress evolution process of underground cave surrounding rock of the target underground cave.

In combination with the second aspect of this application, in a first possible implementation way of the second aspect of this application, the three-component microseismometer includes a first three-component microseismometer and a second three-component microseismometer; the disturbance stress gauge includes a first disturbance stress gauge, a second disturbance stress gauge and a third disturbance stress gauge; the first three-component microseismometer, the first disturbance stress gauge, the second disturbance stress gauge, the third disturbance stress gauge, and the second three-component microseismometer are placed in the borehole in order in a direction from the target underground cave to the nearby excavated cave;

during a placing process, the first three-component microseismometer, the first disturbance stress gauge, the second disturbance stress gauge, the third disturbance stress gauge, and the second three-component microseismometer are pushed into corresponding positions in order by a pusher and then the pusher is withdrawn.

In some embodiments, a process of positioning a source location of rock fracture may comprise:

measuring spatial coordinates of the first three-component microseismometer and the second three-component microseismometer, respectively;

obtaining vibration wave information collected by the first three-component microseismometer and the second three-component microseismometer; and determining the source location of rock fracture based on an overlapping position of the vibration wave information collected by the first three-component microseismometer and the second three-component microseismometer under a propagation positioning mechanism.

In some embodiments, distances from the first three-component microseismometer, the first disturbance stress gauge, the second disturbance stress gauge, the third disturbance stress gauge, and the second three-component microseismometer to a surface of a surrounding rock of the target underground cave are 0.5 m, 1 m, 3 m, 7 m, and 8 m, respectively.

In some embodiments, the device may further comprise a grouting unit, configured for:

performing a full-hole grouting in the borehole to complete placement after the three-component microseismometers and the disturbance stress gauges are placed at corresponding positions in the borehole.

In some embodiments, the inversion analysis unit during performing the numerical inverse analysis of three-dimensional stereoscopic disturbance stress of the surrounding rock of the target underground cave, is further configured for performing the following analysis based on an established numerical computing grid for the underground cave, wherein the grid is refined at positions adjacent to a surface of underground cave surrounding rock and the borehole:

performing underground cave excavation simulation to calculate a preliminary simulation result of the disturbance stress evolution process during the process of excavating the target underground cave; and performing an inverse-analysis on values of ground stress and material parameters involved in the preliminary simulation result of the disturbance stress evolution process by taking the rock structural characteristics of the borehole, the microseismic apparent stress evolution information at each source location of rock fracture, and the disturbance stress evolution information at a position where the disturbance stress gauge is mounted as basic data, and outputting a target simulation result of the disturbance stress evolution process which conforms to the three of the rock structural characteristics of the borehole, the microseismic apparent stress evolution information at each source location of rock fracture, and the disturbance stress evolution information at a position where the disturbance stress gauge is mounted as a stereoscopic identification result of the disturbance stress evolution process of underground cave surrounding rock of the target underground cave.

In some embodiments, during the numerical inverse analysis of three-dimensional stereoscopic disturbance stress of the surrounding rock of the target underground cave, target functions are set with deviations between simulation values and the microseismic apparent stress evolution information at each source location of rock fracture and the disturbance stress evolution information at a position where the disturbance stress gauge is mounted, and then a relationship between parameters for inverse-analysis and the target functions is established with a mechanism of back-propagation neural networks, and optimization is performed with a gradient descent algorithm, and finally updated simulation values are caused to conform to the three of the rock structural characteristics of the borehole, the microseismic apparent stress evolution information at each source location of rock fracture, and the disturbance stress evolution information at a position where the disturbance stress gauge is mounted.

In a third aspect, the disclosure provides a stereoscopic identification apparatus for disturbance stress evolution process of underground cave surrounding rock, comprising a processor and a memory stored with computer programs. The processor when calling the computer programs in the memory may implement the methods provided by the first aspect or any possible implementation way of the first aspect.

In a fourth aspect, the disclosure provides a computer readable storage medium, which stores a plurality of instructions adapted to be loaded by a processor to implement the methods provided by the first aspect or any possible implementation way of the first aspect.

From the above contents, the disclosure has the following beneficial effects:

For the analysis of the disturbance stress evolution process of the surrounding rock of the target underground cave, on the one hand, the disclosure collects the rock structural characteristics of a borehole between the target underground cave and a nearby excavated cave through a borehole camera. On the other hand, the rock fracture vibration wave information on the periphery of the borehole is collected through a three-component microseismometer in the borehole between the target underground cave and a nearby excavated cave and the microseismic apparent stress evolution information at each source location of rock fracture is calculated during the excavation process. Further, the disturbance stress evolution information at a position where the disturbance stress gauge is mounted is collected through the disturbance stress gauge placed in the borehole during the excavation process. Then a numerical inverse analysis of three-dimensional stereoscopic disturbance stress of a surrounding rock of the target underground cave is performed on the basis of the measurement values of the above three aspects. During the analysis, the overall prediction values are corrected from point to volume based on the measurement values to achieve a high-precision identification effect of the stereoscopic disturbance stress evolution process of the surrounding rock, thereby providing accurate and effective data support for the precision evaluation and prediction of the engineering phenomenon of three-dimensional instability of the target underground cave rock.

BRIEF DESCRIPTION OF THE DRAWINGS

In order to more clearly explain the technical solutions in the embodiments of this application, the accompanying drawings to be used in the description of the embodiments will be briefly introduced below. Apparently, the drawings described below only represent some embodiments of the application. For those skilled in the art, other drawings can be obtained based on these drawings without paying creative labor.

DETAILED DESCRIPTION

The technical solutions of the embodiments of the disclosure will be described clearly and completely with reference to the accompanying drawings of the embodiments of the present disclosure. Apparently, the described embodiments are only some embodiments of the present disclosure rather than all embodiments. All other embodiments obtained by those skilled in the art based on the embodiments in the disclosure without paying creative labor will all belong to the scope of the disclosure.

The words of first, second, etc. in the description, claims and the accompanying drawings of the disclosure are used to distinguish similar objects, rather than describe special order or sequential order. It should be understood that the data used in this way can be exchanged under appropriate circumstances so that the embodiments described here can be implemented in an order except for what is described or shown here. In addition, the terms "include" and "have" as well as any of their variants are used to cover a non-exclusive inclusion. For example, a process, method, system, product, or apparatus including a series of steps or modules is not necessarily limited to those steps or modules listed clearly, but can include other steps or modules that are not clearly listed or inherent in the process, method, product, or apparatus. The naming or numbering of the steps mentioned in this disclosure does not mean that the steps in the method process must be performed in the order of the time/logic indicated by the naming or numbering. The implementing order for the numbered or named steps in the flow chart can be changed according to technical purpose to be realized, as long as the same or similar technical effects can be achieved.

The division of the modules appearing in this disclosure is a logical division. There can be other way to divide them in actual applications. For example, multiple modules can be combined or integrated in another system, or some features can be ignored or not be performed. Further, the coupling or direct coupling or communication connection illustrated or discussed can be through some interfaces. The indirect coupling or communication connection between the modules can be electrical or other similar forms, which are not limited in the present disclosure. In addition, the module or sub-module described as a separate part may or may not be a physical separation, may or may not be a physical module, or it can be distributed in multiple circuit modules; part or all modules can be chosen according to actual needs to achieve the purpose of this application.

Before introducing the stereoscopic identification method for the disturbance stress evolution process of underground cave surrounding rock, firstly the background art of this disclosure will be introduced.

The stereoscopic identification method, device and computer readable storage medium for the disturbance stress evolution process of underground cave surrounding rock provided in the disclosure can be used for the stereoscopic identification apparatus for the disturbance stress evolution process of underground cave surrounding rock, which perform a numerical inverse analysis of three-dimensional stereoscopic disturbance stress of a surrounding rock of a target underground cave on the basis of measurement values of a three-component microseismometer and a disturbance stress gauge, and during the analysis, the overall prediction values are corrected from point to volume based on the measurement values to achieve a high-precision identification effect of the evolution process of the stereoscopic disturbance stress of the surrounding rock.

The implementing body of the stereoscopic identification method for the disturbance stress evolution process of underground cave surrounding rock mentioned in the disclosure can be the stereoscopic identification device for the disturbance stress evolution process of underground cave surrounding rock, or various kinds of stereoscopic identification apparatuses for the disturbance stress evolution process of underground cave surrounding rock, such as a server, physical host user equipment or User Equipment (UE), etc. integrating with the stereoscopic identification device for the disturbance stress evolution process of underground cave surrounding rock. The stereoscopic identification device for the disturbance stress evolution process of underground cave surrounding rock can be realized by way of hardware or software. The user equipment (UE) specifically can be a terminal apparatus such as smartphone, tablet, laptop, desktop computer or personal digital assistant (PDA), etc. The stereoscopic identification apparatus for the disturbance stress evolution process of underground cave surrounding rock can be provided in a way of apparatus cluster.

Below, the stereoscopic identification method for the disturbance stress evolution process of underground cave surrounding rock will be introduced.

Figure 1:
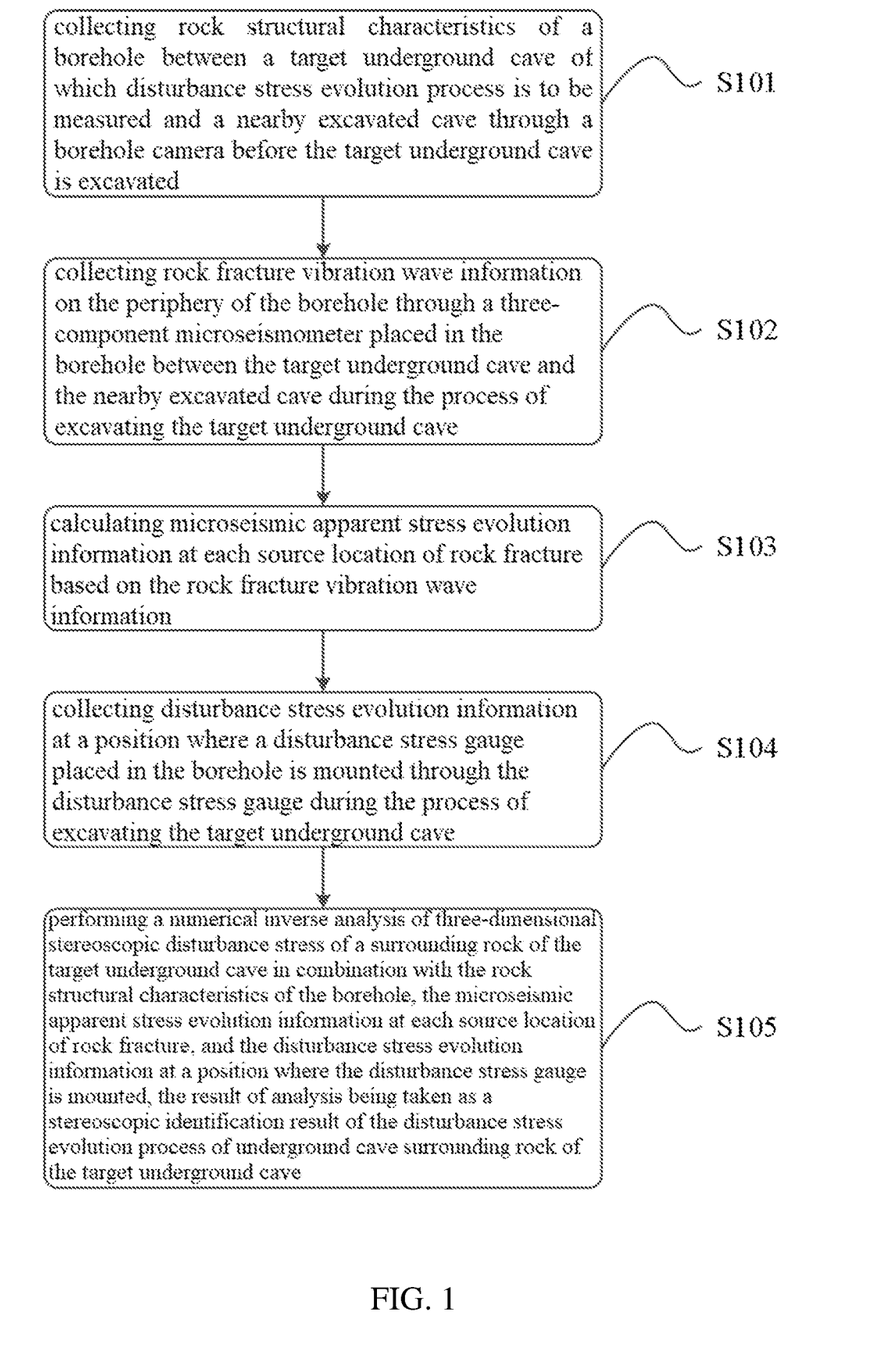
FIG. 1 is a schematic flow chart of a stereoscopic identification method for the disturbance stress evolution process of underground cave surrounding rock according to some embodiments of the disclosure.

Firstly, with reference to FIG. 1, FIG. 1 shows a flow chart of the stereoscopic identification method for the disturbance stress evolution process of underground cave surrounding rock according to the disclosure. The stereoscopic identification method for the disturbance stress evolution process of underground cave surrounding rock of the disclosure specifically can include the following steps S101 to step S105:

In step S101, collecting rock structural characteristics of a borehole between a target underground cave of which a disturbance stress evolution process is to be measured and a nearby excavated cave through a borehole camera before the target underground cave is excavated;

It can be understood that the target underground cave can be any underground cave. When there is a need to analyze the disturbance stress evolution process of the surrounding rock of the underground cave, the analysis mechanism of the disturbance stress evolution process of the surrounding rock provided by the disclosure can be used to analyze the disturbance stress evolution process in a three-dimensional space thereof, so as to obtain a stereoscopic identification effect.

For the analysis of the disturbance stress evolution process of the surrounding rock of the target underground cave, this disclosure obtains corresponding measurement values in three aspects as input data for analysis.

For the measurement values of these three aspects, collection times thereof are related to the excavation work of the target underground cave, which can be divided into a process before excavation and a process during excavation.

Before the target underground cave is excavated, a borehole between a target underground cave and a nearby excavated cave can be excavated according to the needs of this application. The borehole is easy to understand, i.e., a penetrating space between the target underground cave and the nearby excavated cave.

In the borehole, it can be understood that, the rock structural characteristics can be exposed. The rock structural characteristics specifically can be the rock structural characteristics of the wall of the borehole directly. Of course, it also can be rock structural characteristics of the surrounding rock behind the wall of the borehole, which can be adjusted according to actual situation.

For the collection of the rock structural characteristics, it can be implemented by a borehole camera. The borehole camera can be extended deep into the excavated space of the borehole along with an excavation equipment during the excavation process of the borehole to observe and collect the rock structural characteristics, or the borehole camera can be extended deep into the borehole to observe and collect the rock structural characteristics after the excavation of the borehole has completed.

In step S102, collecting the rock fracture vibration wave information on the periphery of the borehole through a three-component microseismometer placed in the borehole between the target underground cave and the nearby excavated cave during the process of excavating the target underground cave.

It can be found that only the rock structural characteristics need to be collected before the target underground cave is excavated, while the measurement values of the subsequent two aspects are collected during the process of excavating the target underground cave.

In the process of collecting the measurement data of the second aspect, specifically, the three-component microseismometer placed in the borehole can be used to perform the collection of initial data. The three-component microseismometer can be understood as a high-precision vibration sensor, which can sense weak vibrations and form corresponding vibration wave information.

Corresponding to the excavation of the target underground cave, the vibration wave information that is sensed during the excavation process can be considered as the rock fracture vibration wave information on the periphery of the borehole with the excavation of the target underground cave.

In step S103, calculating the microseismic apparent stress evolution information at each source location of rock fracture based on the rock fracture vibration wave information.

The above-mentioned rock fracture vibration wave information is not the final data to be obtained in the second aspect of this disclosure, which can be processed further to obtain the microseismic apparent stress evolution information at a corresponding source location of rock fracture based on the specific vibration wave characteristics in the information.

Here, the apparent stress can be understood as the product of the seismic efficiency $\eta$ and the average stress, which is a physical quantity for indicating stress release at the microseismic source.

It can be understood that during the data collection process, the data collected can be timing data, i.e., data collected at different time points with the excavation of the target underground cave. Therefore, the microseismic apparent stresses at different time points obtained by calculation can be processed to obtain a series of microseismic apparent stresses, which reflects changes over time, i.e., the microseismic apparent stresses evolution information.

In step S104, collecting the disturbance stress evolution information at a position where the disturbance stress gauge is mounted through the disturbance stress gauge placed in the borehole during the process of excavating the target underground cave.

In the third aspect, similarly, during the process of excavating the target underground cave, the disturbance stress gauge placed in the borehole can be used to complete the collection of the corresponding disturbance stress evolution information.

Similar to the above, in the data collection process, the data collected by the disturbance stress gauge can be timing data, i.e., data collected at different time points with the excavation of the target underground cave; therefore, the disturbance stresses at different time points obtained by calculation can be processed to obtain a series of disturbance stresses which reflecting changes over time, i.e., the disturbance stress evolution information.

Here, the disturbance stress gauge is a sensor that can sense the disturbance stress and form corresponding disturbance stress sensing data.

In step S105, performing a numerical inverse analysis of three-dimensional stereoscopic disturbance stress of the surrounding rock of the target underground cave in combination with the rock structural characteristics of the borehole, the microseismic apparent stress evolution information at each source location of rock fracture, and the disturbance stress evolution information at a position where the disturbance stress gauge is mounted, the result of analysis being taken as the stereoscopic identification result of the disturbance stress evolution process of underground cave surrounding rock of the target underground cave.

For the inverse analysis process of this disclosure, it can be understood as the following: on the basis of the prediction values (simulation values) of the disturbance stress evolution process of underground cave surrounding rock, correcting the prediction value parameters which are involved in the calculation of the prediction value and correspond to the measurement values, with the relevant measurement values collected above on the condition that there are corresponding time points, until the prediction values after repetitive corrections and updates conform to the measurement values; the prediction values at this time, i.e., the analysis result of the disturbance stress of the surrounding rock of the target underground cave at this condition, can be considered as the precise stereoscopic identification result of the disturbance stress evolution process of underground cave surrounding rock.

In the process of inverse-analysis, it can be found that it is based on that the overall prediction values have been obtained, the individual measurement values are substituted to perform corrections and updates from point to volume. In this way, the precise analysis effect of the overall disturbance stress of the surrounding rock can be realized.

In summary, for the analysis of the disturbance stress evolution process of the surrounding rock of the target underground cave, on the one hand, this disclosure collects the rock structural characteristics of a borehole between the target underground cave and a nearby excavated cave through a borehole camera. On the other hand, the rock fracture vibration wave information on the periphery of the borehole is collected through a three-component microseismometer in the borehole between the target underground cave and the nearby excavated cave and the microseismic apparent stress evolution information at each source location of rock fracture is calculated during the excavation process. Further, the disturbance stress evolution information at a position where the disturbance stress gauge is mounted is collected through the disturbance stress gauge placed in the borehole during the excavation process, then a numerical inverse analysis of three-dimensional stereoscopic disturbance stress of a surrounding rock of the target underground cave is performed on the basis of the measurement values of the above three aspects. During the analysis, the overall prediction values are corrected from point to volume based on the measurement values to achieve a high-precision identification effect of the stereoscopic disturbance stress evolution process of the surrounding rock, providing accurate and effective data support for the precision evaluation and prediction of the engineering phenomenon of three-dimensional instability of the target underground cave rock.

In the following, the various steps of the above embodiment shown in FIG. 1 and their possible implementation ways in actual applications will be described in detail.

Figure 2:
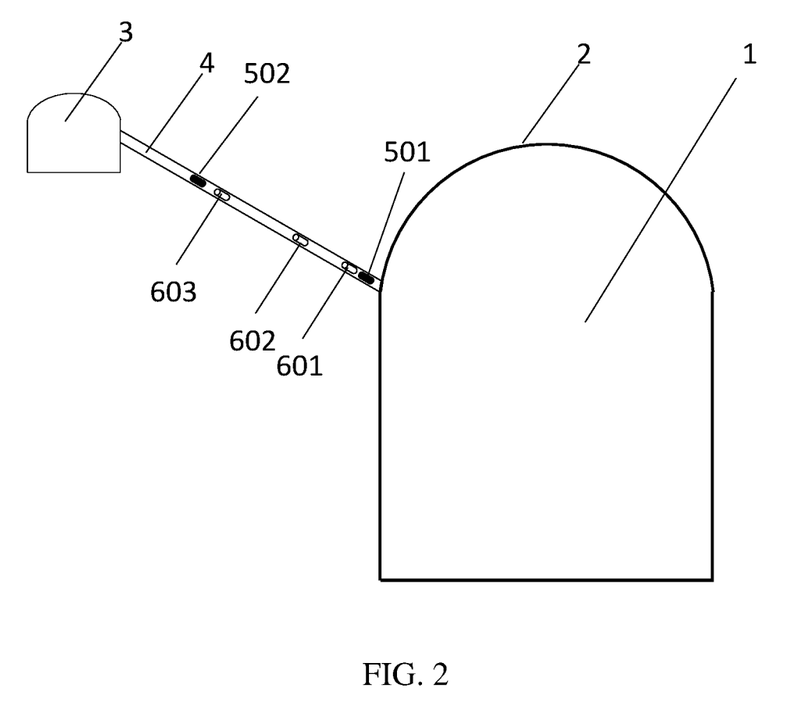
FIG. 2 is a schematic scenario diagram of a stereoscopic identification method for the disturbance stress evolution process of underground cave surrounding rock according to some embodiments of the disclosure.

Referring to FIG. 2 showing a scenario schematic diagram of the stereoscopic identification method of the disturbance stress evolution process of underground cave surrounding rock according to some embodiments of the disclosure, in which the above mentioned target underground cave 1, the surface of surrounding rock of target underground cave 2, the nearby excavated cave 3, the borehole 4 can be seen. In addition, it can be seen that for the three-component microseismometer and disturbance stress gauge placed in the borehole, the number of which in actual applications can be one, but also can be other number.

On the basis of the embodiment shown in FIG. 2, as an implementation way suitable for use, in the actual application of this disclosure, the three-component microseismometer includes a first three-component microseismometer 501 and a second three-component microseismometer 502; the disturbance stress gauge includes a first disturbance stress gauge 601, a second disturbance stress gauge 602 and a third disturbance stress gauge 603. The first three-component microseismometer, the first disturbance stress gauge, the second disturbance stress gauge, the third disturbance stress gauge, and the second three-component microseismometer are placed in the borehole in order in a direction from the target underground cave to the nearby excavated cave.

During the placing process, the first three-component microseismometer, the first disturbance stress gauge, the second disturbance stress gauge, the third disturbance stress gauge, and the second three-component microseismometer are pushed into corresponding positions in order by a pusher and then the pusher is withdrawn.

It can be understood that through a number of three-component microseismometers and disturbance stress gauges, data at multiple positions can be collected at the same time, thereby providing rich raw data to further improve the processing accuracy of the later data processing.

Further, it can be seen that in the placement of the disturbance stress gauges, the disturbance stress gauges are specifically placed between the first three-component microseismometer and the second three-component microseismometer. Under this placement, the subsequent data processing can obtain a more accurate source location of rock fracture by increasing the distance between three-component microseismometers. In addition, during the final inverse analysis process, a more precise data coordination with the disturbance stress evolution information collected by the disturbance stress gauges between the three-component microseismometers can be achieved compared with the arrangement of the multiple three-component microseismometers spaced by a smaller distance, so as to further improve the precision of the inverse analysis and obtain a more accurate stereoscopic identification results of the disturbance stress evolution process of underground cave surrounding rock.

Further, for the determination of the source location of rock fracture, as another implementation way suitable for use, the positioning process can comprise:

measuring spatial coordinates of the first three-component microseismometer and the second three-component microseismometer, respectively;

obtaining vibration wave information collected by the first three-component microseismometer and the second three-component microseismometer;

determining the source location of rock fracture based on an overlapping position of the vibration wave information collected by the first three-component microseismometer and the second three-component microseismometer under the propagation positioning mechanism.

Figure 3:
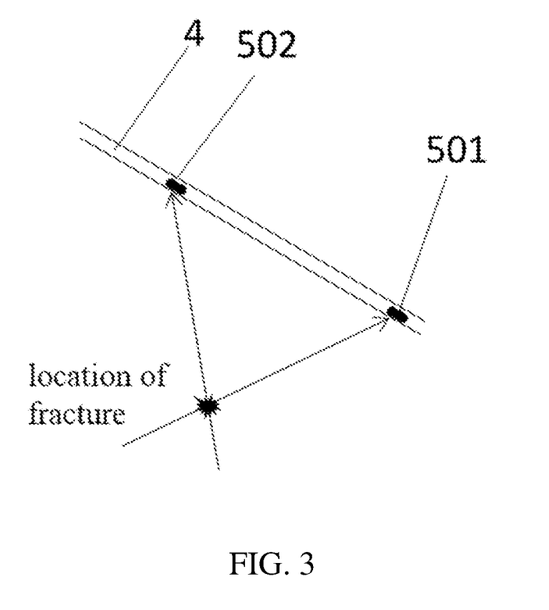
FIG. 3 is a schematic scenario diagram of positioning a source location of rock fracture.

Further, referring to FIG. 3 showing a schematic scenario diagram of positioning the source location of rock fracture, in a specific processing process, each rock fracture vibration wave information sensed by the first three-component microseismometer and the second three-component microseismometer can be obtained, then each location of rock fracture on the periphery of the borehole is precisely positioned by using the spatial coordinates of the first three-component microseismometer and the second three-component microseismometer as well as the sensed vibration wave information. Specifically, the propagation directions of the first three-component microseismometer and the second three-component microseismometer are used to establish a target function, and the target function is solved to obtain an overlapping position, which is the corresponding source location of rock fracture.

As an example, in a practical application, on the basis that the coordinates of the first three-component microseismometer are (−0.4330, 0.0000, 0.2500) and the coordinates of the secondary three-component microseismometer are (−6.9282, 0.0000, 4.0000), the solved location of rock fracture is (−1.2600, 2.3000, 0.7600) by the propagation direction positioning principle of the above two three-component microseismometers.

It can be understood that compared to that the vibration wave information collected by a single three-component microseismometer is used to determine the source location of rock fracture, the source location of rock fracture determined by the vibration wave information collected by multiple three-component microseismometers has a larger identification range and a higher identification accuracy in practical applications with the final overlapping position as the identified source location of rock fracture.

As another kind of practical implementation way, in practical applications, there are special placement schemes for the specific position of each of the three-component microseismometers and disturbance stress gauges.

That is, the distances from the first three-component microseismometer, the first disturbance stress meter, the second disturbance stress gauge, the third disturbance stress gauge, and the three-component microseismometer to the surface of the surrounding rock of the target underground cave specifically can be 0.5 m, 1 m, 3 m, 7 m, and 8 m, respectively. It has found from actual operations that with the placement of these distances, there is higher data collection accuracy and a high-precision processing of the stereoscopic identification result of the disturbance stress evolution process of underground cave surrounding rock can be achieved.

During the specific placement process, the first three-component microseismometer is placed in the borehole, and a pusher is used to push the first three-component microseismometer to a specified position and then the pusher is withdrawn. The distance from the position of the first three-component microseismometer to the bottom of the borehole is 0.5 m.

The first disturbance stress gauge, the second disturbance stress gauge, and the third disturbance stress gauge are placed in order in the borehole. A pusher is used to push the first disturbance stress gauge, the second disturbance stress gauge, and the third disturbance stress gauge to specified positions and then the pusher is withdrawn. The distances from the positions of the first disturbance stress gauge, the second disturbance stress gauge, and the third disturbance stress gauge to the bottom of the borehole are 1 m, 3 m, and 7 m respectively.

The second three-component microseismometer is placed in the borehole, and a pusher is used to push the second three-component microseismometer to a specified position and then the pusher is withdrawn. The distance from the position of the second three-component microseismometer to the bottom of the borehole is 8 m.

As another example, a spatial coordinate system is established according to the right-hand rule, and the spatial coordinates of the first three-component microseismometer, the second three-component microseismometer, the first disturbance stress gauge, the second disturbance stress gauge and the third disturbance stress gauge are recorded. The spatial coordinates of the first three-component microseismometer, the second three-component microseismometer, the first disturbance stress gauge, the second disturbance stress gauge and the third disturbance stress gauge are (−0.4330, 0.0000, 0.2500), (−6.9282 0.0000, 4.0000), (−0.8660, 0.0000, 0.5000), (−2.5981, 0.0000, 1.5000), (−6.0622, 0.0000, 3.5000) in sequence, respectively.

Further, it should be noted that during the placement process of the three-component microseismometers and the disturbance stress gauges, in addition to placing them in the corresponding positions, in actual operations, it also involves grouting. The grout is injected to make the microseismometers and the disturbance stress gauges couple with the rock mass on the wall of the borehole so as to ensure that a high precision data collection effect can be obtained.

As to the grouting process, as another implementing way suitable for practical use, specifically, it can be triggered to be conducted by the stereoscopic identification method for the disturbance stress evolution process of underground cave surrounding rock of the disclosure. That is, the positions of the three-component microseismometers and the disturbance stress gauges are monitored, and after the three-component microseismometers and the disturbance stress gauges are placed at corresponding positions in the borehole, a full-hole grouting is performed in the borehole to complete the placement.

As to the subsequent inverse analysis processing, as another implementing way suitable for use, during the numerical inverse analysis of three-dimensional stereoscopic disturbance stress of the surrounding rock of the target underground cave, the following analysis is performed based on an established numerical computing grid for the underground cave, wherein the grid is refined at positions adjacent to the surface of underground cave surrounding rock and the borehole.

Underground cave excavation simulation is performed to calculate a preliminary simulation result of the disturbance stress evolution process during the process of excavating the target underground cave.

By taking the rock structural characteristics of the borehole, the microseismic apparent stress evolution information at each source location of rock fracture, and the disturbance stress evolution information at a position where the disturbance stress gauge is mounted as the basic data, an inverse-analysis is performed on the values of the material parameters (such as elastic modulus, internal agglomeration, internal friction angle, and force on the boundary surface, etc.) and a value of ground stress involved in the preliminary simulation result of the disturbance stress evolution process, and a target simulation result of the disturbance stress evolution process which conforms to the three of the rock structural characteristics of the borehole, the microseismic apparent stress evolution information at each source location of rock fracture, and the disturbance stress evolution information at a position where the disturbance stress gauge is mounted, is outputted as a stereoscopic identification result of the disturbance stress evolution process of underground cave surrounding rock of the target underground cave.

It can be understood that the processing of the prediction values mentioned in the foregoing, is just the processing of the preliminary simulation results referred to here, which can be understood as the following: on the basis of considering the rock structural characteristics of the borehole tested and identified by the borehole camera, at the level of data processing, setting the material parameters and the ground stress field information preliminarily; setting excavation simulation according to the excavation scheme, and extracting the stress nephogram information of the borehole and the rock fracture profile; and obtaining the law of stress variation of the surrounding rock of the target underground cave with the excavation preliminarily, so as to obtain a preliminary simulation result. This simulation processing is based on numerical computing grids. In this way, a regional simulation effect of high segmentation accuracy can be realized. Thereafter, a specific inverse analysis processing can be performed based on the preliminary simulation result in combination with the measurement parameters, i.e., conducting a correction processing and an update processing of the values of the ground stress and the relevant material parameters until a target simulation result of the disturbance stress involution process is obtained, for which the measurement values (the three of the rock structural characteristics of the borehole, the microseismic apparent stress evolution information at each source location of rock fracture, and the disturbance stress evolution information at a position where the disturbance stress gauge is mounted) conform to the detailed parameters in the overall simulation result.

At this time, the target simulation result of the disturbance stress evolution process, i.e., the stress nephogram information of the target underground cave and the area around the borehole, can be used as the final stereoscopic identification result of the disturbance stress evolution process of underground cave surrounding rock of the target underground cave.

Further, as another implementing way suitable for use, specifically, during the numerical inverse analysis of three-dimensional stereoscopic disturbance stress of the surrounding rock of the target underground cave, target functions may be set with the deviations between the simulation values and the microseismic apparent stress evolution information at each source location of rock fracture and the disturbance stress evolution information at a position where the disturbance stress gauge is mounted, and then the relationship between the parameters for inverse-analysis and the target functions is established with the mechanism of Back propagation (BP) neural networks, and optimization is performed with the gradient descent algorithm, and finally the updated simulation values are caused to conform to the three of the rock structural characteristics of the borehole, the microseismic apparent stress evolution information at each source location of rock fracture, and the disturbance stress evolution information at a position where the disturbance stress gauge is mounted.

The above is the introduction of the stereoscopic identification method for the disturbance stress evolution process of underground cave surrounding rock, in order to better implementing the stereoscopic identification method for the disturbance stress evolution process of underground cave surrounding rock according to some embodiments of the disclosure, the disclosure also provides a stereoscopic identification device for the disturbance stress evolution process of underground cave surrounding rock from functional modules.

Figure 4:
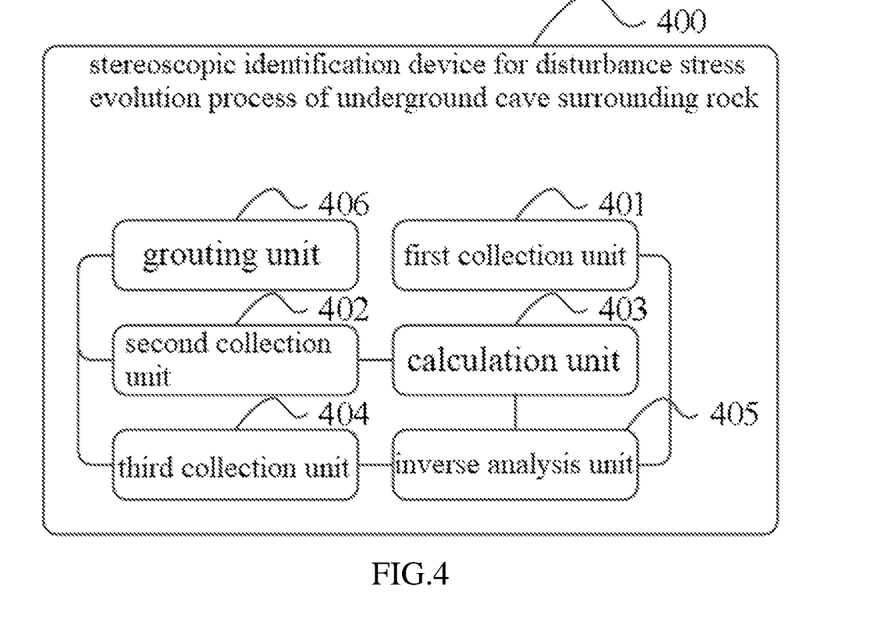
FIG. 4 is a schematic structural diagram of a stereoscopic identification device for the disturbance stress evolution process of underground cave surrounding rock according to some embodiments of the disclosure.

Referring to FIG. 4, which is a structural schematic diagram of a stereoscopic identification device for the disturbance stress evolution process of underground cave surrounding rock. In this disclosure, the stereoscopic identification device 400 for the disturbance stress evolution process of underground cave surrounding rock specifically has the following configuration:

a first collection unit 401, configured for collecting the rock structural characteristics of a borehole between a target underground cave of which the disturbance stress evolution process is to be measured and a nearby excavated cave through a borehole camera before the target underground cave is excavated;

a second collection unit 402, configured for collecting the rock fracture vibration wave information on the periphery of the borehole through a three-component microseismometer placed in the borehole between the target underground cave and the nearby excavated cave during the process of excavating the target underground cave;

a calculation unit 403, configured for calculating the microseismic apparent stress evolution information at each source location of rock fracture based on the rock fracture vibration wave information;

a third collection unit 404, configured for collecting the disturbance stress evolution information at a position where the disturbance stress gauge is mounted through the disturbance stress gauge placed in the borehole during the process of excavating the target underground cave; and an inverse analysis unit 405, configured for performing a numerical inverse analysis of three-dimensional stereoscopic disturbance stress of the surrounding rock of the target underground cave in combination with the rock structural characteristics of the borehole, the microseismic apparent stress evolution information at each source location of rock fracture, and the disturbance stress evolution information at a position where the disturbance stress gauge is mounted, the result of analysis being taken as the stereoscopic identification result of the disturbance stress evolution process of underground cave surrounding rock of the target underground cave.

In an exemplary implementation way, the three-component microseismometer includes a first three-component microseismometer and a second three-component microseismometer. The disturbance stress gauge includes a first disturbance stress gauge, a second disturbance stress gauge and a third disturbance stress gauge. The first three-component microseismometer, the first disturbance stress gauge, the second disturbance stress gauge, the third disturbance stress gauge, and the second three-component microseismometer are placed in the borehole in order in a direction from the target underground cave to the nearby excavated cave.

During the placing process, the first three-component microseismometer, the first disturbance stress gauge, the second disturbance stress gauge, the third disturbance stress gauge, and the second three-component microseismometer are pushed into corresponding positions in order by a pusher and thereafter the pusher are withdrawn.

In another exemplary implementing way, the process of positioning the source location of rock fracture source includes:

measuring the spatial coordinates of the first three-component microseismometer and the second three-component microseismometer, respectively;

obtaining the vibration wave information collected by the first three-component microseismometer and the second three-component microseismometer;

determining the source location of rock fracture based on an overlapping position of the vibration wave information collected by the first three-component microseismometer and the second three-component microseismometer under the propagation positioning mechanism.

In another exemplary implementation way, the distances from the first three-component microseismometer, the first disturbance stress meter, the second disturbance stress gauge, the third disturbance stress gauge, and the second three-component microseismometer to the surface of the surrounding rock of the target underground cave are 0.5 m, 1 m, 3 m, 7 m, and 8 m, respectively.

In another exemplary implementation way, the device also includes a grouting unit 406, which is used for performing a full-hole grouting in the borehole to complete placement after the three-component microseismometers and the disturbance stress gauges are placed at corresponding positions in the borehole.

In another exemplary implementation way, the inverse analysis unit 405 is configured for, during the numerical inverse analysis of three-dimensional stereoscopic disturbance stress of the surrounding rock of the target underground cave, performing the following analysis based on an established numerical computing grid for the underground cave, wherein the grid is refined at positions adjacent to the surface of underground cave surrounding rock and the borehole:

performing underground cave excavation simulation to calculate a preliminary simulation result of the disturbance stress evolution process during the process of excavating the target underground cave;

performing an inverse-analysis on the values of the material parameters and ground stress involved in the preliminary simulation result of the disturbance stress evolution process by taking the rock structural characteristics of the borehole, the microseismic apparent stress evolution information at each source location of rock fracture, and the disturbance stress evolution information at a position where the disturbance stress gauge is mounted as the basic data, and outputting a target simulation result of the disturbance stress evolution process which conforms to the three of the rock structural characteristics of the borehole, the microseismic apparent stress evolution information at each source location of rock fracture, and the disturbance stress evolution information at a position where the disturbance stress gauge is mounted, as a stereoscopic identification result of the disturbance stress involution process of underground cave surrounding rock of the target underground cave.

In another exemplary implementation way, during the numerical inverse analysis of three-dimensional stereoscopic disturbance stress of the surrounding rock of the target underground cave, target functions are set with the deviations between the simulation values and the microseismic apparent stress evolution information at each source location of rock fracture and the disturbance stress evolution information at a position where the disturbance stress gauge is mounted respectively, and then the relationships between the parameters for inverse-analysis and the target functions are established with the mechanism of BP neural networks, and optimization is performed with the gradient descent algorithm, and finally the updated simulation values are caused to conform to the three of the rock structural characteristics of the borehole, the microseismic apparent stress evolution information at each source location of rock fracture, and the disturbance stress evolution information at a position where the disturbance stress gauge is mounted.

Figure 5:
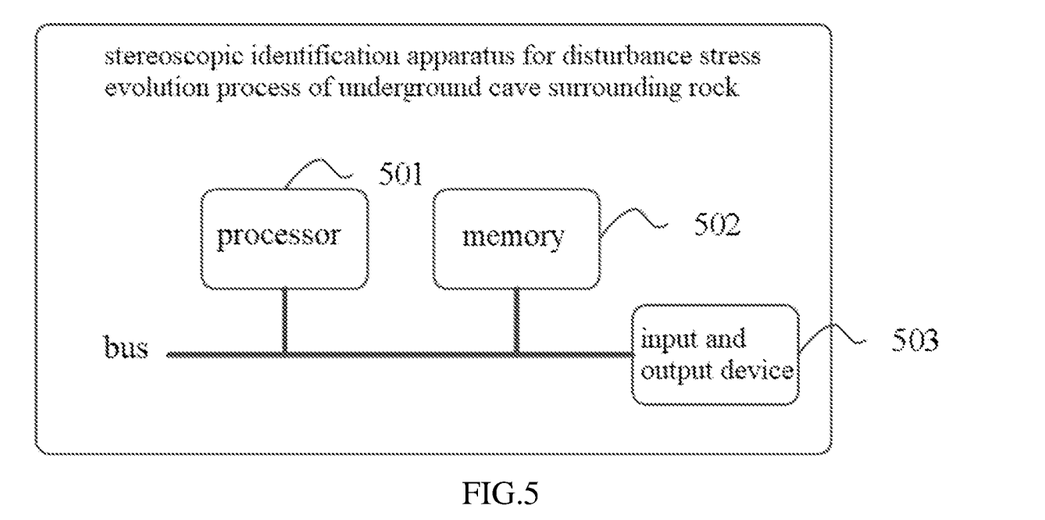
FIG. 5 shows a schematic structural diagram of a stereoscopic identification apparatus for the disturbance stress evolution process of underground cave surrounding rock according to some embodiments of the disclosure.

The disclosure also provides a stereoscopic identification apparatus for the disturbance stress evolution process of underground cave surrounding rock from a perspective of hardware structure. Referring to FIG. 5 showing a structural schematic diagram of the stereoscopic identification apparatus for the disturbance stress evolution process of underground cave surrounding rock of the disclosure, specifically, the stereoscopic identification apparatus for the disturbance stress evolution process of underground cave surrounding rock of the disclosure comprises a processor 501, a memory 502 as well as an input and output device 503. The processor 501 when executing the computer programs stored in the memory 502, can implement the various steps of the stereoscopic identification method for the disturbance stress evolution process of underground cave surrounding rock of the corresponding embodiment as shown in FIG. 1; or alternatively, the processor 501 when executing the computer programs stored in the memory 502, can implement the function of each unit in the corresponding embodiment as shown in FIG. 4. The memory 502 is configured to store the computer programs required by the processor 501 upon performing the stereoscopic identification method for the disturbance stress evolution process of underground cave surrounding rock of the corresponding embodiment as shown in FIG. 1.

For example, the computer programs can be divided into one or more modules/units. The one or more modules/units are stored in the memory 502, and executed by the processor 501 to achieve this disclosure. One or more modules/units can be a series of instruction segments of computer programs that can complete specific functions. The instruction segments are used to describe the execution process of the computer programs in the computer device.

The stereoscopic identification apparatus for the disturbance stress evolution process of underground cave surrounding rock may include but not limited to the processor 501, the memory 502, and the input and output device 503. The person skilled in the art can understand that it is just an example of the stereoscopic identification apparatus for the disturbance stress evolution process of underground cave surrounding rock, rather than a limitation to the stereoscopic identification apparatus for the disturbance stress evolution process of underground cave surrounding rock. It can contain more or less components than illustrated, or some components or different components can be combined. For example, the stereoscopic identification apparatus for the disturbance stress evolution process of underground cave surrounding rock can also include network access devices, bus, etc., and the processor 501, the memory 502, the input and output device 503 and so on are connected through the bus.

The processor 501 can be a central processing unit (CPU), or other general processors, Digital Signal Processor (DSP), Application Specific Integrated Circuit (ASIC), and Field-Programmable Gate Array (FPGA) or other programmable logic devices, discrete gate or transistor logic gate devices, discrete hardware components, etc. The general processor can be a microprocessor or any conventional processor. The processor is the control center of the stereoscopic identification apparatus for the disturbance stress evolution process of underground cave surrounding rock and connects the respective parts of the whole apparatus through various interfaces and lines.

The memory 502 can be used to store computer programs and/or modules. The processor 501 executes or runs the computer programs and/or modules stored in the memory 502 and calls the data stored in the memory 502 to implement various functions of the computer device. The memory 502 can mainly include program storage area and data storage area. The program storage area can store operating systems, application programs required by at least one function, etc. Data storage area can store data or the like created according to the use of the stereoscopic identification apparatus for the disturbance stress evolution process of underground cave surrounding rock. In addition, the memory can include high-speed random access memory, as well as non-volatile memory, such as hard disk, internal memory, plug-in hard disk, Smart Media Card (SMC), Security Digital (SD) card, Flash card, at least one disk storage device, flash memory device, or other volatile solid storage devices.

The processor 501 when executing the computer programs stored in the memory 502, specifically can achieve the following functions:

collecting the rock structural characteristics of a borehole between a target underground cave of which the disturbance stress evolution process is to be measured and a nearby excavated cave through a borehole camera before the target underground cave is excavated;

collecting the rock fracture vibration wave information on the periphery of the borehole through a three-component microseismometer placed in the borehole between the target underground cave and the nearby excavated cave during the process of excavating the target underground cave;

calculating the microseismic apparent stress evolution information at each source location of rock fracture based on the rock fracture vibration wave information;

collecting the disturbance stress evolution information at a position where the disturbance stress gauge is mounted through the disturbance stress gauge placed in the borehole during the process of excavating the target underground cave; and performing a numerical inverse analysis of three-dimensional stereoscopic disturbance stress of the surrounding rock of the target underground cave in combination with the rock structural characteristics of the borehole, the microseismic apparent stress evolution information at each source location of rock fracture, and the disturbance stress evolution information at a position where the disturbance stress gauge is mounted, the result of analysis being taken as the stereoscopic identification result of the disturbance stress evolution process of underground cave surrounding rock of the target underground cave.

A person skilled in the art can clearly understand that for the convenience and simplicity of the description, the specific operating process of the above stereoscopic identification device, apparatus for the disturbance stress evolution process of underground cave surrounding rock and their corresponding units can be referred to the stereoscopic identification method for the disturbance stress evolution process of underground cave surrounding rock described in the embodiment shown in FIG. 1, which will not be repeated here.

A person of ordinary skill in the art can understand that all or part of the steps in the various methods of the above-mentioned embodiments can be completed by instructions, or they can be completed by relevant hardware under the control of instructions. The instructions can be stored in a computer readable storage medium, and be loaded and executed by the processor.

To this end, this disclosure provides a computer-readable storage medium on which a plurality of instructions are stored, and the instructions can be loaded by a processor to implement the steps of the stereoscopic identification method for the disturbance stress evolution process of underground cave surrounding rock of the corresponding embodiment as shown in FIG. 1. The specific operations can be referred to the stereoscopic identification method for the disturbance stress evolution process of underground cave surrounding rock described in the embodiment shown in FIG. 1, which will not be repeated here.

The computer readable storage medium may include Read Only Memory (ROM), Random Access Memory (RAM), magnetic disk or optical disc, etc.

Since the instructions stored in the computer readable storage medium can be configured for implementing the steps of the stereoscopic identification method for the disturbance stress evolution process of underground cave surrounding rock of the corresponding embodiment as shown in FIG. 1 in the disclosure, the advantageous effects of the stereoscopic identification method for the disturbance stress evolution process of underground cave surrounding rock of the corresponding embodiment as shown in FIG. 1 in the disclosure can be achieved, the details of which can be referred to the description in the foregoing, and will not be repeated here.

The stereoscopic identification method, device, apparatus and computer readable storage medium for the disturbance stress evolution process of underground cave surrounding rock provided by the disclosure have been expound fully above. The principle and implementing ways of the disclosure have been explained by use of specific examples, but the description of the above embodiments is only used to help understand the method of this application and its core ideas. At the same time, for those skilled in the art, there will be modifications in specific implementation ways and range of use based on the ideas of this application. In summary, the content of this description should not be understood as restrictions on this application.

What is claimed is:

1. A stereoscopic identification method for disturbance stress evolution process of rock that surrounds an underground cave, comprising:
    collecting rock structural characteristics of a borehole between a target underground cave of which the disturbance stress evolution process is to be measured and a nearby excavated cave through a borehole camera before the target underground cave is excavated;
    collecting rock fracture vibration wave information on the periphery of the borehole through a three-component microseismometer placed in the borehole between the target underground cave and the nearby excavated cave during the process of excavating the target underground cave;
    calculating microseismic apparent stress evolution information at each source location of rock fracture based on the rock fracture vibration wave information;
    collecting disturbance stress evolution information, at a position where a disturbance stress gauge is mounted, through the disturbance stress gauge placed in the borehole during the process of excavating the target underground cave; and
    performing a numerical inverse analysis of three-dimensional stereoscopic disturbance stress of a surrounding rock of the target underground cave in combination with the rock structural characteristics of the borehole, the microseismic apparent stress evolution information at each source location of rock fracture, and the disturbance stress evolution information at a position where the disturbance stress gauge is mounted, the result of analysis being taken as a stereoscopic identification result of the disturbance stress evolution process of rock that surrounds an underground cave of the target underground cave.

2. The method according to claim 1, wherein the three-component microseismometer includes a first three-component microseismometer and a second three-component microseismometer; the disturbance stress gauge includes a first disturbance stress gauge, a second disturbance stress gauge and a third disturbance stress gauge; the first three-component microseismometer, the first disturbance stress gauge, the second disturbance stress gauge, the third disturbance stress gauge, and the second three-component microseismometer are placed in the borehole in order in a direction from the target underground cave to the nearby excavated cave;
    during a placing process, the first three-component microseismometer, the first disturbance stress gauge, the second disturbance stress gauge, the third disturbance stress gauge, and the second three-component microseismometer are pushed into corresponding positions in order by a pusher and then the pusher is withdrawn.

3. The method according to claim 2, wherein a process of positioning a source location of rock fracture comprises:
    measuring spatial coordinates of the first three-component microseismometer and the second three-component microseismometer, respectively;
    obtaining vibration wave information collected by the first three-component microseismometer and the second three-component microseismometer; and
    determining the source location of rock fracture based on an overlapping position of the vibration wave information collected by the first three-component microseismometer and the second three-component microseismometer under a propagation positioning mechanism.

4. The method according to claim 2, wherein distances from the first three-component microseismometer, the first disturbance stress gauge, the second disturbance stress gauge, the third disturbance stress gauge, and the second three-component microseismometer to a surface of a surrounding rock of the target underground cave are 0.5 m, 1 m, 3 m, 7 m, and 8 m, respectively.

5. The method according to claim 1, further comprising:
    performing a full-hole grouting in the borehole to complete placement after the three-component microseismometers and the disturbance stress gauges are placed at corresponding positions in the borehole.

6. The method according to claim 1, wherein during the numerical inverse analysis of three-dimensional stereoscopic disturbance stress of the surrounding rock of the target underground cave, performing the following analysis based on an established numerical computing grid for the underground cave, wherein the grid is refined at positions adjacent to a surface of rock that surrounds an underground cave and the borehole:

performing underground cave excavation simulation to calculate a preliminary simulation result of the disturbance stress evolution process during the process of excavating the target underground cave;

performing an inverse-analysis on values of ground stress and material parameters involved in the preliminary simulation result of the disturbance stress evolution process by taking the rock structural characteristics of the borehole, the microseismic apparent stress evolution information at each source location of rock fracture, and the disturbance stress evolution information at a position where the disturbance stress gauge is mounted as basic data, and outputting a target simulation result of the disturbance stress evolution process which conforms to the three of the rock structural characteristics of the borehole, the microseismic apparent stress evolution information at each source location of rock fracture, and the disturbance stress evolution information at a position where the disturbance stress gauge is mounted as a stereoscopic identification result of the disturbance stress evolution process of rock that surrounds an underground cave of the target underground cave.

7. The method according to claim 6, wherein, during the numerical inverse analysis of three-dimensional stereoscopic disturbance stress of the surrounding rock of the target underground cave, target functions are set with deviations between simulation values and the microseismic apparent stress evolution information at each source location of rock fracture and the disturbance stress evolution information at a position where the disturbance stress gauge is mounted, and then a relationship between parameters for inverse-analysis and the target functions is established with a mechanism of backpropagation neural networks, and optimization is performed with a gradient descent algorithm, and finally updated simulation values are caused to conform to the three of the rock structural characteristics of the borehole, the microseismic apparent stress evolution information at each source location of rock fracture, and the disturbance stress evolution information at a position where the disturbance stress gauge is mounted.

8. A stereoscopic identification apparatus for disturbance stress evolution process of rock that surrounds an underground cave, comprising a processor and a memory stored with computer programs, wherein the processor, when calling the computer programs in the memory, implements the method of claim 1.

9. A computer readable storage medium, comprising a plurality of instructions stored thereon, wherein the instructions are adapted to be loaded by a processor to implement the method of claim 1.

* * * * *